(12) United States Patent
Yoshida et al.

(10) Patent No.: US 9,886,932 B2
(45) Date of Patent: Feb. 6, 2018

(54) MULTI-PRIMARY COLOR DISPLAY DEVICE

(71) Applicant: Sharp Kabushiki Kaisha, Osaka-shi, Osaka (JP)

(72) Inventors: Yuichi Yoshida, Osaka (JP); Kazunari Tomizawa, Osaka (JP); Tomohiko Mori, Osaka (JP); Makoto Hasegawa, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 213 days.

(21) Appl. No.: 14/426,468

(22) PCT Filed: Sep. 2, 2013

(86) PCT No.: PCT/JP2013/073557
§ 371 (c)(1),
(2) Date: Mar. 6, 2015

(87) PCT Pub. No.: WO2014/038517
PCT Pub. Date: Mar. 13, 2014

(65) Prior Publication Data
US 2015/0235615 A1 Aug. 20, 2015

(30) Foreign Application Priority Data
Sep. 7, 2012 (JP) .................................. 2012-197375

(51) Int. Cl.
*G09G 5/02* (2006.01)

(52) U.S. Cl.
CPC ..... *G09G 5/028* (2013.01); *G09G 2300/0452* (2013.01); *G09G 2320/0233* (2013.01); *G09G 2320/0242* (2013.01); *G09G 2340/06* (2013.01)

(58) Field of Classification Search
CPC ....... G09G 2340/06; G09G 2300/0452; G09G 3/3607; G09G 2320/0242; G09G 2360/16;
(Continued)

(56) References Cited

U.S. PATENT DOCUMENTS 6,486,923 B1 * 11/2002 Maeshima ............... G09G 3/32
345/589
2009/0322662 A1 12/2009 Yoshida et al.
(Continued)

FOREIGN PATENT DOCUMENTS

JP 2004-529396 A 9/2004
WO 02/101644 A2 12/2002
(Continued)

OTHER PUBLICATIONS

Official Communication issued in International Patent Application No. PCT/JP2013/073557, dated Oct. 1, 2013.
(Continued)

*Primary Examiner* — Jeffrey Chow
(74) *Attorney, Agent, or Firm* — Keating & Bennett, LLP

(57) ABSTRACT

A multi-primary color display device (100) includes: a multi-primary color display panel (10) including a pixel that is defined by a plurality of sub pixels including a red sub pixel (R), a green sub pixel (G), a blue sub pixel (B), and a yellow sub pixel (Ye); and a signal converting circuit (20) converting a three-primary color image signal corresponding to three primary colors into a multi-primary color image signal corresponding to four or more primary colors. The signal converting circuit (20), in a case where a three-primary color image signal representing at least an achromatic color of a half tone is input, performs a signal conversion such that variations in luminance levels of the plurality of sub pixels are equalized.

12 Claims, 8 Drawing Sheets

(58) Field of Classification Search
CPC .......... G09G 3/2003; G09G 2300/0443; G06T 2207/10024
See application file for complete search history.

(56) References Cited

U.S. PATENT DOCUMENTS

| | | | |
|---|---|---|---|
| 2011/0210911 A1* | 9/2011 | Nakamura | G09G 3/3655 345/88 |
| 2011/0254759 A1* | 10/2011 | Mori | G09G 3/3607 345/88 |
| 2012/0133670 A1* | 5/2012 | Kim | G09G 5/02 345/593 |
| 2012/0206513 A1* | 8/2012 | Ueno | G09G 3/3413 345/697 |
| 2012/0223875 A1* | 9/2012 | Lau | H01L 27/156 345/83 |
| 2012/0281033 A1 | 11/2012 | Yoshida et al. | |
| 2013/0010014 A1 | 1/2013 | Hasegawa et al. | |

FOREIGN PATENT DOCUMENTS

| | | |
|---|---|---|
| WO | 2008/090845 A1 | 7/2008 |
| WO | 2011/083808 A1 | 7/2011 |
| WO | 2011/115169 A1 | 9/2011 |

OTHER PUBLICATIONS

Pointer, "The Gamut of Real Surface Colours," Color Research and Application, vol. 5, No. 3, Fall 1980, pp. 145-155.

* cited by examiner

MULTI-PRIMARY COLOR DISPLAY DEVICE

TECHNICAL FIELD

The present invention relates to a multi-primary color display device that performs display using four or more primary colors.

BACKGROUND ART

Currently, various display devices starting from liquid crystal display devices are used for a variety of purposes. In a general display device, one pixel is configured by three sub pixels displaying red, green, and blue that are three primary colors of light, and color display can be enabled by such a pixel.

However, a conventional display device has a problem in that the range of displayable colors (called a "color reproduction range") is narrow. FIG. 18 illustrates a color reproduction range of a conventional display device that performs display using three primary colors. FIG. 18 is an xy chromaticity diagram of an XYZ chromaticity system, and a triangle having three points corresponding to three primary colors of red, green, and blue as its vertexes represents the color reproduction range. In addition, in the figure, colors of various objects (see Non-Patent Literature 1) existing in the natural world, which are revealed by Pointer, are plotted using x marks. As can be understood from FIG. 18, there are object colors that are not included in the color reproduction range, and a display device performing display using three primary colors is not capable of displaying some of the object colors.

Thus, in order to broaden the color reproduction range of the display device, a technique for increasing the number of primary colors used for display to be four or more has been proposed.

For example, in Patent Literature 1, as illustrated in FIG. 19, a liquid crystal display device 800 in which one pixel is configured by six sub pixels R, G, B, Ye, Cy, and Ma displaying red, green, blue, yellow, cyan, and magenta is disclosed. The color reproduction range of the liquid crystal display device 800 is illustrated in FIG. 20. As illustrated in FIG. 20, the color reproduction range represented by a hexagon having six points corresponding to six primary colors as its vertexes almost covers the object colors. In this way, by increasing the number of primary colors that are used for display, the color reproduction range can be broaden. In this specification, a display device performing display using four or more primary colors will be referred to as a "multi-primary color display device". In addition, a conventional general display device that performs display using three primary colors will be referred to as a "three-primary color display device".

As a general format of an image signal that is input to the three-primary color display device, there is an RGB format, a YCC format, or the like. By including three parameters (in other words, a three-dimensional signal) in the image signal (an RGB signal or an YCC signal) of such a format, the luminance levels (gray scale levels) of three primary colors (red, green, and blue) used for display are uniquely determined.

In order to perform display using the multi-primary color display device, it is necessary to convert an image signal of a format used for the three-primary color display device into an image signal including more parameters (four or more parameters). Such an image signal corresponding to the four or more primary colors, in this specification, will be referred to as a "multi-primary color image signal". In addition, an image signal of a format used for the three-primary color display device, in other words, an image signal corresponding to the three primary colors will be referred to as a "three-primary color image signal" in this specification.

CITATION LIST

Patent Literature 1: JP 2004-529396 W
Non Patent Literature 1: M. R. Pointer, "The gamut of real surface colors", Color Research and Application, Vol. 5, No. 3, pp. 145-155 (1980)

SUMMARY OF INVENTION

Technical Problem

As a result of a detailed review of relation between a technique for converting a three primary color image signal into a multi-primary color image signal (a multi-primary color conversion) and the display quality of a multi-primary color display device, inventors of the present application have found that a decrease in the display quality due to variations in the luminance levels of a plurality of sub pixels configuring one pixel occurs when a multi-primary color conversion is simply performed in a case where the pixel displays an achromatic color.

The present invention is devised in consideration of the above-described problem, and an object thereof is to provide a multi-primary color display device capable of suppressing a decrease in the display quality when a pixel displays an achromatic color.

Solution to Problem

A multi-primary color display device in an embodiment of the present invention includes: a multi-primary color display panel including a pixel that is defined by a plurality of sub pixels including a red sub pixel, a green sub pixel, a blue sub pixel, and a yellow sub pixel; and a signal converting circuit converting a three-primary color image signal corresponding to three primary colors into a multi-primary color image signal corresponding to four or more primary colors, and the signal converting circuit, in a case where a three-primary color image signal representing at least an achromatic color of a half tone is input, performs a signal conversion such that variations in luminance levels of the plurality of sub pixels are equalized.

In an embodiment, the signal converting circuit includes a multi-primary color implementing unit that generates a multi-primary color image signal based on an input three-primary color image signal, and the signal converting circuit further includes a luminance ratio adjusting unit that adjusts a multi-primary color image signal generated by the multi-primary color implementing unit such that variations in luminance levels of the plurality of sub pixels are equalized in a case where a three-primary color image signal representing at least an achromatic color of a half tone is input to the multi-primary color implementing unit.

In an embodiment, the luminance ratio adjusting unit performs adjustment of the multi-primary color image signal such that a luminance level of the yellow sub pixel that is defined by the multi-primary color image signal is lowered after the adjustment than before the adjustment, and luminance levels of the red sub pixel and the green sub pixel defined by the multi-primary color image signal are raised after the adjustment than before the adjustment.

In an embodiment, the luminance ratio adjusting unit performs the adjustment of the multi-primary color image signal such that ΔE, which is a color difference between before and after the adjustment, of an achromatic color displayed by the pixel is 3.0 or less.

In an embodiment, the signal converting circuit includes a multi-primary color implementing unit that generates a multi-primary color image signal based on an input three-primary color image signal, and in a case where the three-primary color image signal representing at least an achromatic color of a half tone is input, the multi-primary color implementing unit generates a multi-primary color image signal in which variations in luminance levels of the plurality of sub pixels are equalized.

In an embodiment, when the number of primary colors used for display is n, the multi-primary color implementing unit determines gray scale levels of (n−3) primary colors among the n primary colors by referring to a lookup table based on the input three-primary color image signal and calculates gray scale levels of the remaining three primary colors among the n primary colors by performing calculation using the gray scale levels of the (n−3) primary colors.

In an embodiment, the multi-primary color implementing unit includes a lookup table memory storing the lookup table and a calculation unit that performs the calculation.

In an embodiment, the three-primary color image signal representing at least the achromatic color of the half tone is a three-primary color image signal that represents an achromatic color of a 64/255 gray scale to a 200/255 gray scale.

In an embodiment, in a case where a three-primary color image signal representing an achromatic color of a 128/255 gray scale is input, the signal converting circuit performs a signal conversion such that a root means square value of differences between an average luminance level of the plurality of sub pixels and luminance levels of the plurality of sub pixels is 0.023 or less.

In an embodiment, the plurality of sub pixels include a cyan sub pixel.

In an embodiment, the plurality of sub pixels include an additional red sub pixel.

In an embodiment, the multi-primary color display panel includes one pair of substrates facing each other and a liquid crystal layer disposed between the one pair of substrates.

Advantageous Effects of Invention

According to an embodiment of the present invention, a multi-primary color display device capable of suppressing a decrease in the display quality at the time of displaying an achromatic color using a pixel is provided.

DESCRIPTION OF EMBODIMENTS

Hereinafter, embodiments of the present invention will be described with reference to the drawings. However, the present invention is not limited to the embodiments described below.

Embodiment 1

Figure 1:
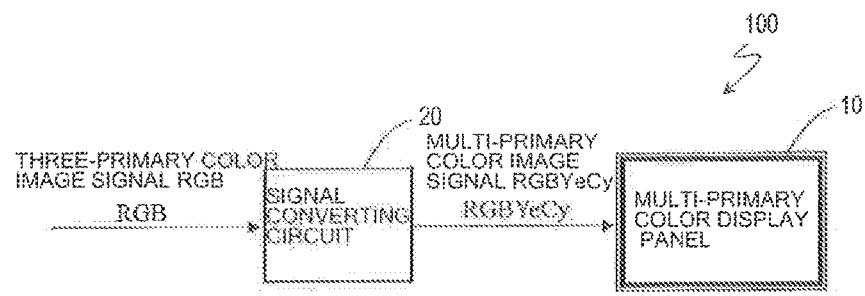
FIG. 1 is a block diagram that schematically illustrates a liquid crystal display device 100 according to an embodiment of the present invention.

FIG. 1 illustrates a liquid crystal display device 100 according to this embodiment. The liquid crystal display device 100, as illustrated in FIG. 1, includes a multi-primary color display panel 10 and a signal converting circuit 20 and is a multi-primary color display device that performs display using four or more primary colors.

Figure 2:
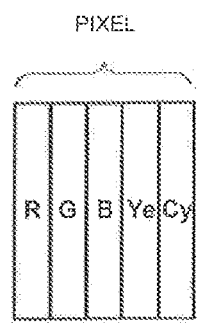
FIG. 2 is a diagram that illustrates a pixel configuration of the liquid crystal display device 100.

The multi-primary color display panel 10 includes a plurality of pixels arranged in a matrix pattern, and each pixel is defined by a plurality of sub pixels. FIG. 2 illustrates the pixel configuration of the multi-primary color display panel 10. As illustrated in FIG. 2, each pixel is defined by a red sub pixel R displaying red, a green sub pixel G displaying green, a blue sub pixel B displaying blue, a yellow sub pixel Ye displaying yellow, and a cyan sub pixel Cy displaying cyan.

Table 1 presented below illustrates an example of chromaticity x, y and Y values of primary colors (in other words, red, green, blue, yellow, and cyan) displayed by the red sub pixel R, the green sub pixel G, the blue sub pixel B, the yellow sub pixel Ye, and the cyan sub pixel Cy.

TABLE 1

|        | x      | y      | Y      |
|--------|--------|--------|--------|
| Red    | 0.6792 | 0.3068 | 0.0881 |
| Green  | 0.2311 | 0.6291 | 0.2575 |
| Blue   | 0.1461 | 0.0472 | 0.0784 |
| Yellow | 0.4628 | 0.5216 | 0.4496 |
| Cyan   | 0.1293 | 0.3269 | 0.1264 |

In FIG. 2, while an example is illustrated in which the red sub pixel R, the green sub pixel G, the blue sub pixel B, the yellow sub pixel Ye, and the cyan sub pixel Cy are arranged in this order from the left side toward the right side within the pixel, the arrangement of the sub pixels is not limited thereto.

The signal converting circuit 20 converts an input three-primary color image signal into a multi-primary color image signal corresponding to four or more (here, five) primary colors. The multi-primary color image signal output from the signal converting circuit 20 is input to the multi-primary color display panel 10, and a color corresponding to the input multi-primary color image signal is displayed by each pixel. In this embodiment, the multi-primary color display panel 10 is a liquid crystal display panel that includes one pair of substrates facing each other and a liquid crystal layer disposed between the substrates forming one pair.

As a display mode of the liquid crystal display panel, a vertical alignment mode capable of realizing a wide viewing angle characteristic may be appropriately used, and, for example, an MVA (Multi-domain Vertical Alignment) mode or a CPA (Continuous Pinwheel Alignment) mode may be used. A panel of the MVA mode or the CPA mode includes a liquid crystal layer of the vertical alignment type in which liquid crystal molecules are aligned approximately vertically with respect to the substrate when no voltage is applied, and a plurality of areas having mutually-different tilting azimuths of the liquid crystal molecules are formed within each sub pixel when a voltage is applied, whereby display of a wide viewing angle is realized.

Alternatively, as the display mode of the liquid crystal display panel, a lateral electric field mode capable of realizing a wide viewing angle characteristic may be appropriately used, and, for example, an IPS (In-Plane Switching) mode or an FFS (Fringe Field Switching) mode may be used. The panel of the IPS mode or the FFS mode includes a liquid crystal layer of a horizontal alignment type in which liquid crystal molecules are aligned approximately horizontally with respect to the substrate when no voltage is applied, and, by changing the alignment direction of the liquid crystal molecules within a plane that is approximately parallel to the substrate within each sub pixel when a voltage is applied, display of a wide viewing angle is realized.

As described above, in a case where display is performed using the multi-primary color display device, a three-primary color image signal is converted into a multi-primary color image signal. However, in a case where colors represented by an image signal of the format used for a three-primary color display device are represented using four or more primary colors, the luminance levels of the primary colors are not uniquely determined, and there are multiple combinations of the luminance levels. In other words, it can be stated that the colors displayed by the pixels of the multi-primary color display device have redundancy. In the liquid crystal display device 100 according to this embodiment, by using the redundancy of colors described above, a decrease in the display quality at the time of displaying an achromatic color using a pixel is suppressed. Hereinafter, this point will be described more specifically.

In a case where display is performed using three primary colors, relations among tristimulus values ($X_0$, $Y_0$, and $Z_0$) of a certain color and luminance levels (R, G, and B) of red, green, and blue are represented in the following Equation (1), and there is only one combination of the luminance levels (gray scale levels) of red, green, and blue that corresponds to one tristimulus value. In addition, coefficients $X_R$, $Y_R$, $Z_R$, ... $Z_B$ of a conversion matrix having three rows and three columns represented in Equation (1) are determined based on XYZ values of the red sub pixel, the green sub pixel, and the blue sub pixel of the three-primary color display device.

[Mathematical Formula 1]

$$\begin{pmatrix} X_0 \\ Y_0 \\ Z_0 \end{pmatrix} = \begin{pmatrix} X_R & X_G & X_B \\ Y_R & Y_G & Y_B \\ Z_R & Z_G & Z_B \end{pmatrix} \begin{pmatrix} R \\ G \\ B \end{pmatrix} \quad (1)$$

In contrast, for example, in a case where display is performed using five primary colors, relations among tristimulus values ($X_0$, $Y_0$, and $Z_0$) of a certain color and luminance levels (R, G, B, Ye, and Cy) of red, green, blue, yellow, and cyan are represented in the following Equation (2), and there are a plurality of combinations of luminance levels (gray scale levels) of red, green, and blue corresponding to one tristimulus value. In addition, coefficients $X_R$, $Y_R$, $Z_R$, ..., $Z_{Cy}$ of a conversion matrix having three rows and five columns represented in Equation (2) are determined based on XYZ values of the red sub pixel R, the green sub pixel G, the blue sub pixel B, the yellow sub pixel Ye, and the cyan sub pixel Cy of the multi-primary color display panel 10.

[Mathematical Formula 2]

$$\begin{pmatrix} X_0 \\ Y_0 \\ Z_0 \end{pmatrix} = \begin{pmatrix} X_R & X_G & X_B & X_{Ye} & X_{Cy} \\ Y_R & Y_G & Y_B & Y_{Ye} & Y_{Cy} \\ Z_R & Z_G & Z_B & Z_{Ye} & Z_{Cy} \end{pmatrix} \begin{pmatrix} R \\ G \\ B \\ Ye \\ Cy \end{pmatrix} \quad (2)$$

In a case where a three-primary color image signal representing at least a certain achromatic color of a half tone is input, the signal converting circuit 20 of the liquid crystal display device 100 performs a signal conversion such that variations in the luminance levels of a plurality of sub pixels are equalized. In other words, the signal conversion is performed such that variations between the luminance levels of the sub pixels are smaller than those of a case (a comparative example to be described later) where a three-primary color image signal representing an achromatic color is simply converted into a multi-primary color image signal. Accordingly, a decrease in the display quality at the time of displaying an achromatic color using the pixel can be suppressed.

Figure 3:
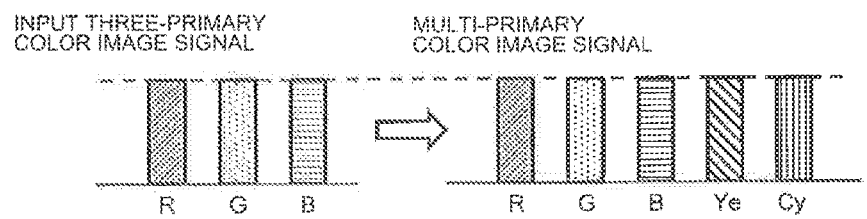
FIG. 3 is a diagram that illustrates a multi-primary color conversion of a comparative example.

FIG. 3 schematically illustrates a signal conversion of the comparative example. This comparative example represents a general signal conversion of a case where an achromatic color is displayed. In this comparative example, the gray scale levels of red, green, and blue defined by an input three-primary color image signal directly become the gray scale levels of the red sub pixel R, the green sub pixel G, the blue sub pixel B, the yellow sub pixel Ye, and the cyan sub pixel Cy defined by a multi-primary color image signal. For example, a three-primary color image signal representing an achromatic color of a gray scale level of "128", in other words, a three-primary color image signal represented as (R, G, B)=(128, 128, 128) is converted into a multi-primary color image signal defining a gray scale level of 128 for all the red sub pixel R, the green sub pixel G, the blue sub pixel B, the yellow sub pixel Ye, and the cyan sub pixel Cy, in other words, a multi-primary color image signal represented as (R, G, B, Ye, Cy)=(128, 128, 128, 128, 128).

Figure 4:
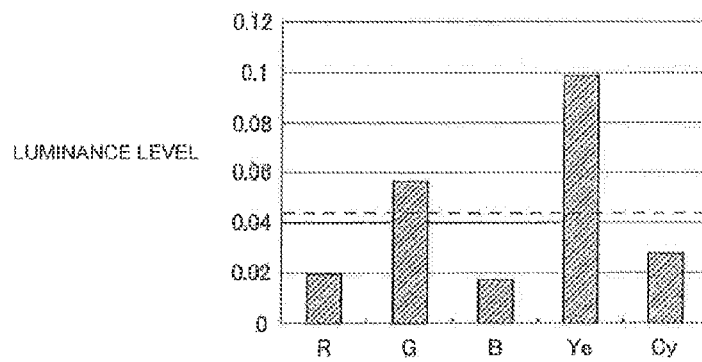
FIG. 4 is a graph that illustrates luminance levels of a red sub pixel R, a green sub pixel G, a blue sub pixel B, a yellow sub pixel Ye, and a cyan sub pixel Cy in a case where the multi-primary color conversion of the comparative example is performed.
Figure 5:
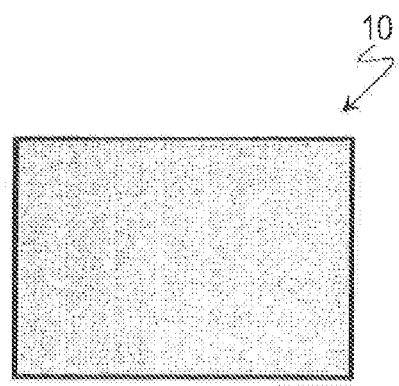
FIG. 5 is a diagram that schematically illustrates display of a stripe shape occurring in a case where the multi-primary color conversion of the comparative example is performed.

In a case where this multi-primary color image signal is displayed by the multi-primary color display panel 10 including a red sub pixel R, a green sub pixel G, a blue sub pixel B, a yellow sub pixel Ye, and a cyan sub pixel Cy according to specifications illustrated in Table 1, the luminance levels of the sub pixels are as illustrated in FIG. 4. In FIG. 4, a dotted line illustrates an average luminance level. As illustrated in FIG. 4, among the plurality of sub pixels defining one pixel, the luminance level of the yellow sub pixel Ye is extremely high. For this reason, the yellow sub pixel Ye is conspicuous and, as illustrated in FIG. 5, becomes display of a stripe pattern in a case where color filers are arranged in a stripe pattern. Accordingly, the display quality and the sensed resolution deteriorate.

In contrast, in a case where a three-primary color image signal representing at least an achromatic color of a half tone is input, the signal converting circuit 20 of the liquid crystal display device 100 performs a signal conversion such that variations in the luminance levels of the plurality of sub pixels are equalized. In other words, a combination of luminance levels in which the variations in the luminance levels of the sub pixels are smaller than those of the above-described comparative example is selected. For this reason, it is difficult for the yellow sub pixel Ye to be conspicuous, and deteriorations in the display quality and the sensed resolution are suppressed.

Figure 6:
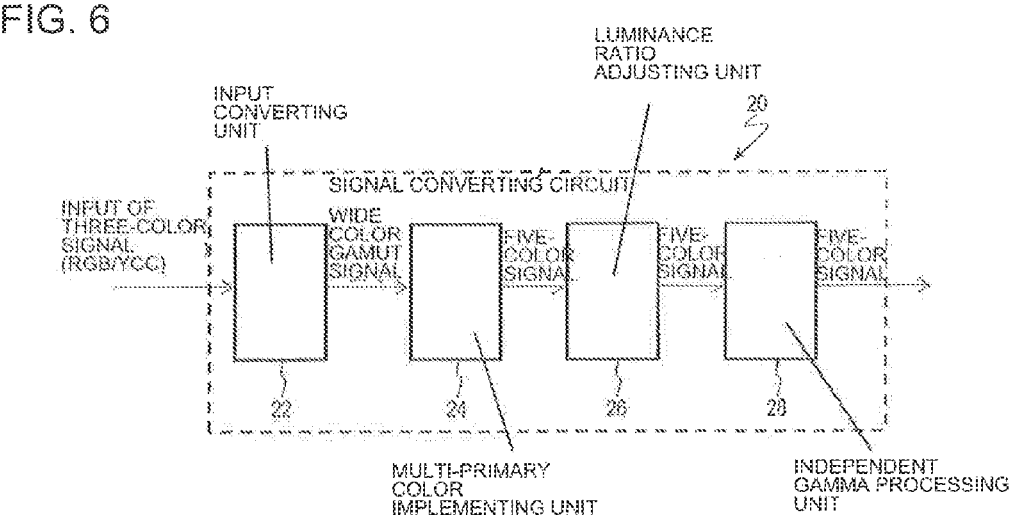
FIG. 6 is a block diagram that illustrates an example of the specific configuration of a signal converting circuit 20 included in the liquid crystal display device 100.

FIG. 6 illustrates an example of the specific configuration of the signal converting circuit 20. The signal converting circuit 20 includes a multi-primary color implementing unit 24 that generates a multi-primary color image signal based on an input three-primary color image signal. In the example illustrated in FIG. 6, the signal converting circuit 20 further includes an input converting unit 22, a luminance ratio adjusting unit 26, and an independent gamma processing unit 28.

The input converting unit 22 converts the input three-color signal (three-primary color image signal) into a wide color gamut signal used inside the circuit. The three-color signal, for example, is an RGB signal or a YCC signal. More specifically, the wide color gamut signal is an RGB signal including a negative value (negative gray scale level), a tristimulus value XYZ, or the like.

The multi-primary color implementing unit 24 converts the wide color gamut signal into a five-color signal (multi-primary color image signal). This conversion, for example, as will be described later, is performed using a lookup table.

In a case where a three-primary color image signal representing at least an achromatic color of a half tone is input (here, input as a wide color gamut signal) to the multi-primary color implementing unit 24, the luminance ratio adjusting unit 26 adjusts the five-color signal (multi-primary color image signal) generated by the multi-primary color implementing unit 24 such that variations in the luminance levels of the plurality of sub pixels are equalized. In other words, the luminance ratio of the plurality of sub pixels is adjusted by the luminance ratio adjusting unit 26.

The luminance ratio adjusting unit 26 typically adjusts a five-color signal (multi-primary color image signal) such that the luminance level of the yellow sub pixel Ye defined by the five-color signal becomes lower after the adjustment than before the adjustment, and the luminance levels of the red sub pixel R and the green sub pixel G defined by the five-color signal are higher after the adjustment than before the adjustment.

The independent gamma processing unit 28 independently performs a gamma process for each sub pixel. The five-color signal output from the independent gamma processing unit 28 is input to the multi-primary color display panel 10.

Here, a specific example of the adjustment of the luminance ratio that is performed by the luminance ratio adjusting unit 26 will be described.

Here, a case will be described as an example where a three-color signal (represented as (R, G, B)=(128, 128, 128)) representing an achromatic color of a gray scale of "128" is input. In a case where the multi-primary color implementing unit 24 performs a simple conversion similar to that of the comparative example, a five-color signal represented as (R, G, B, Ye, Cy)=(128, 128, 128, 128, 128) is generated by the multi-primary color implementing unit 24. In a case where display is performed by the multi-primary color display panel 10 by using this five-color signal without performing adjustment using the luminance ratio adjusting unit 26, the chromaticity x, y, and Y values of an achromatic color displayed by the pixel are as those illustrated in the following Table 2. In addition, the luminance ratio of the red sub pixel R, the green sub pixel G, the blue sub pixel B, the yellow sub pixel Ye, and the cyan sub pixel Cy is as illustrated in FIG. 4.

TABLE 2

| x | y | Y |
|---|---|---|
| 0.272 | 0.277 | 0.220 |

Here, as an index that evaluates variations in the luminance levels of a plurality of sub pixels defining one pixel, a root mean square value L (hereinafter, referred to as a "variation amount") of differences between an average luminance level of the plurality of sub pixels and the luminance levels of the plurality of sub pixels will be used. When the luminance level of the red sub pixel R is denoted by $Y_R$, the luminance level of the green sub pixel G is denoted by $Y_G$, the luminance level of the blue sub pixel B is denoted by $Y_B$, the luminance level of the yellow sub pixel Ye is denoted by $Y_{Ye}$, and the luminance level of the cyan sub pixel Cy is denoted by $Y_{Cy}$, and an average luminance level thereof is denoted by $Y_{ave}$, the variation amount L is represented in the following Equation (3). In case of the luminance ratio illustrated in FIG. 4, the variation amount L is 0.030784.

[Mathematical Formula 3]

$$L = \sqrt{\frac{(Y_R - Y_{ave})^2 + (Y_G - Y_{ave})^2 + (Y_B - Y_{ave})^2 + (Y_{Ye} - Y_{ave})^2 + (Y_{Cy} - Y_{ave})^2}{5}} \quad (3)$$

Figure 7:
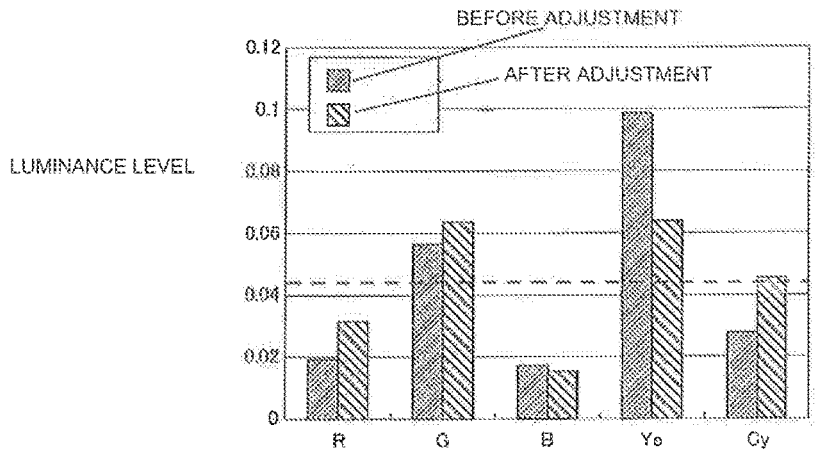
FIG. 7 is a graph that illustrates the luminance levels of each sub pixel before and after adjustment performed by a luminance ratio adjusting unit 26 included in the signal converting circuit 20.

The luminance ratio adjusting unit 26, for example, adjusts the five-color signal represented as (R, G, B, Ye, Cy)=(128, 128, 128, 128, 128) into a five-color signal represented as (R, G, B, Ye, Cy)=(160, 135, 122, 105, 160). In a case where display is performed by the multi-primary color display panel 10 by using the five-color signal after the adjustment, the chromaticity x, y, and Y values of an achromatic color displayed by the pixel are as illustrated in the following Table 3. In addition, the luminance ratios of the red sub pixel R, the green sub pixel G, the blue sub pixel B, the yellow sub pixel Ye, and the cyan sub pixel Cy before the adjustment and after the adjustment are as illustrated in FIG. 7.

TABLE 3

| x | y | Y |
|---|---|---|
| 0.272 | 0.277 | 0.220 |

By comparing Table 2 with Table 3, it can be understood that the chromaticity levels x and y of an achromatic color, which is displayed by the pixel, before and after the adjustment are the same. In addition, it can be understood that a Y value of an achromatic color, which is displayed by the pixel, is almost the same before and after the adjustment.

In addition, based on FIG. 7, it can be understood that the luminance level of the yellow sub pixel Ye becomes lower after the adjustment than before the adjustment, and the luminance levels of the red sub pixel R and the green sub pixel G become higher after the adjustment than before the adjustment. In addition, it can be understood that the luminance level of the blue sub pixel B becomes slightly lower after the adjustment than before the adjustment, and the luminance level of the cyan sub pixel Cy becomes slightly higher after the adjustment than before the adjustment.

In case of the luminance ratio after the adjustment that is illustrated in FIG. 7, the variation amount L is 0.01868. Thus, the variation amount L decreases by about 40% after the adjustment. Accordingly, it is difficult for the yellow sub pixel Ye to be conspicuous, and display of a stripe pattern is prevented, whereby a decrease in the display quality is suppressed.

In addition, from the viewpoint of performing color reproduction according to an input, it is preferable that the luminance ratio adjusting unit 26 performs adjustment such that a color difference ΔE of an achromatic color, which is displayed by the pixel, between before and after the adjustment is as small as possible. More specifically, when the pixel is viewed from the front side, the color difference ΔE between before and after the adjustment is preferably 3.0 or less and is more preferably 2.0 or less. A difference between colors having a color difference ΔE of 2.0 or less therebetween is not noticeable unless the colors are adjacently compared with each other, and, generally, the colors may be referred to as a same color without any problem.

Figure 8:
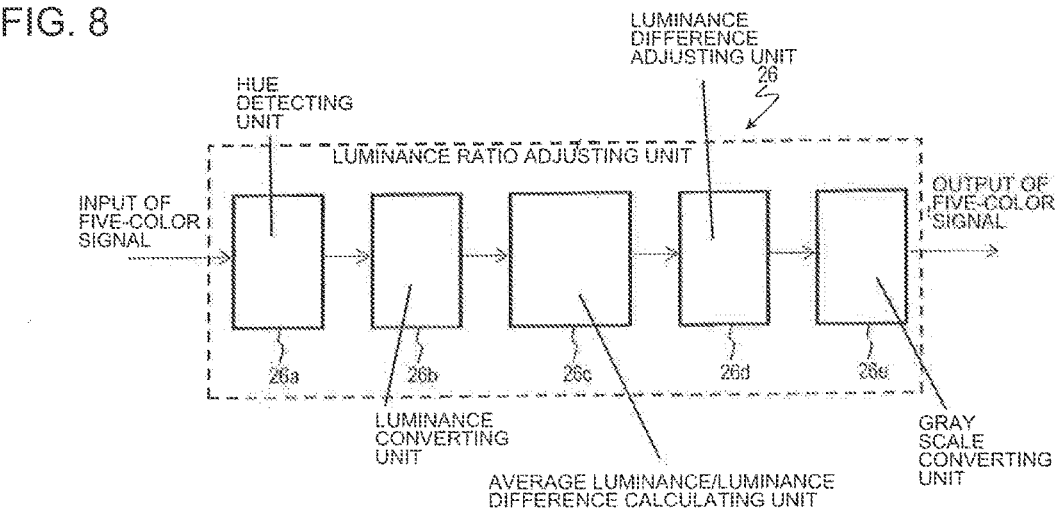
FIG. 8 is a block diagram that illustrates a block diagram illustrating an example of the specific configuration of the luminance ratio adjusting unit 26 included in the signal converting circuit 20.

FIG. 8 illustrates an example of the specific configuration of the luminance ratio adjusting unit 26. In the example illustrated in FIG. 8, the luminance ratio adjusting unit 26 includes: a hue detecting unit 26a; a luminance converting unit 26b; an average luminance/luminance difference calculating unit 26c; a luminance difference adjusting unit 26d; and a gray scale converting unit 26e.

The hue detecting unit 26a detects the hue of a color defined by a multi-primary color image signal generated by the multi-primary color implementing unit 24. In other words, the hue detecting unit 26a detects a hue from an input five-color signal. It is determined whether or not the luminance ratio adjusting unit 26 performs adjustment according to the hue detected by the hue detecting unit 26a. The luminance ratio adjusting unit 26 mainly adjusts a five-color signal representing an achromatic color but does not adjust a five-color signal having high saturation.

The luminance converting unit 26b converts a five-color signal (in other words, gray scale information) representing a gray scale level of each sub pixel into luminance information. The average luminance/luminance difference calculating unit 26c calculates average luminance of the red sub pixel R, the green sub pixel G, the blue sub pixel B, the yellow sub pixel Ye, and the cyan sub pixel Cy and calculates a difference between the average luminance and the luminance of each sub pixel.

The luminance difference adjusting unit 26d redistributes the luminance to each sub pixel such that the variation amount L becomes small. The gray scale converting unit 26e converts the luminance information into a five-color signal (in other words, gray scale information) representing the gray scale level of each sub pixel.

Figure 9:
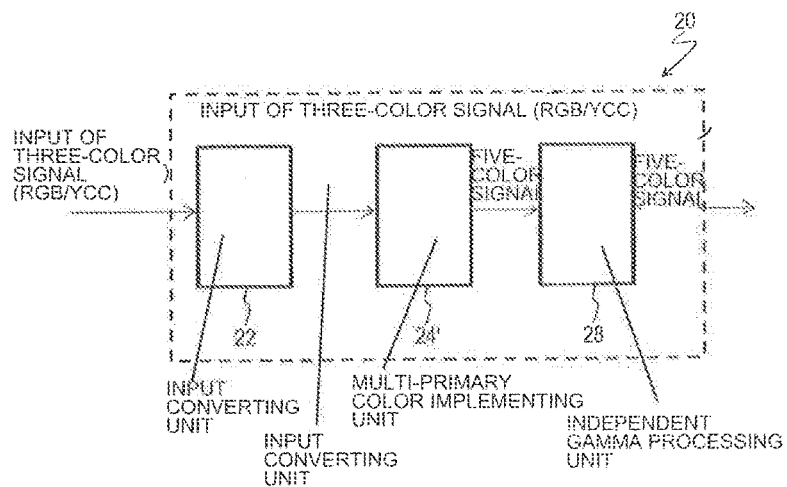
FIG. 9 is a block diagram that illustrates another example of the specific configuration of the signal converting circuit 20 included in the liquid crystal display device 100.

However, the specific configuration of the signal converting circuit 20 is not limited to the example illustrated in FIG. 8. In addition, the signal converting circuit 20 does not necessarily need to include the luminance ratio adjusting unit 26. FIG. 9 illustrates another example of the specific configuration of the signal converting circuit 20.

In the example illustrated in FIG. 9, the signal converting circuit 20 does not include the luminance ratio adjusting unit 26. In addition, in the example illustrated in FIG. 9, the signal converting circuit 20 includes a multi-primary color implementing unit 24' that has a function different from that of the multi-primary color implementing unit 24 represented in the example illustrated in FIG. 6. In a case where a three-color signal (three-primary color image signal) representing at least an achromatic color of a half tone is input, this multi-primary color implementing unit 24' generates a five-color signal (multi-primary color image signal) in which variations in the luminance levels of a plurality of sub pixels are averaged. In other words, in the example illustrated in FIG. 9, the multi-primary color implementing unit 24' performs a multi-primary color conversion in consideration of the luminance ratio.

Here, an example of the specific configurations of the multi-primary color implementing units 24 and 24' will be described. By including a lookup table that includes data representing gray scale levels of sub pixels corresponding to a color specified by a three-primary color image signal, each of the multi-primary color implementing units 24 and 24' can generate a multi-primary color image signal by referring to this lookup table according to the input three-primary color image signal. However, in a case where data representing gray scale levels of sub pixels is included in the lookup table for all the colors, the amount of data of the lookup table becomes large, and it is difficult to configure the lookup table in a simple manner by using a low-priced memory having a small capacity.

Figure 10:
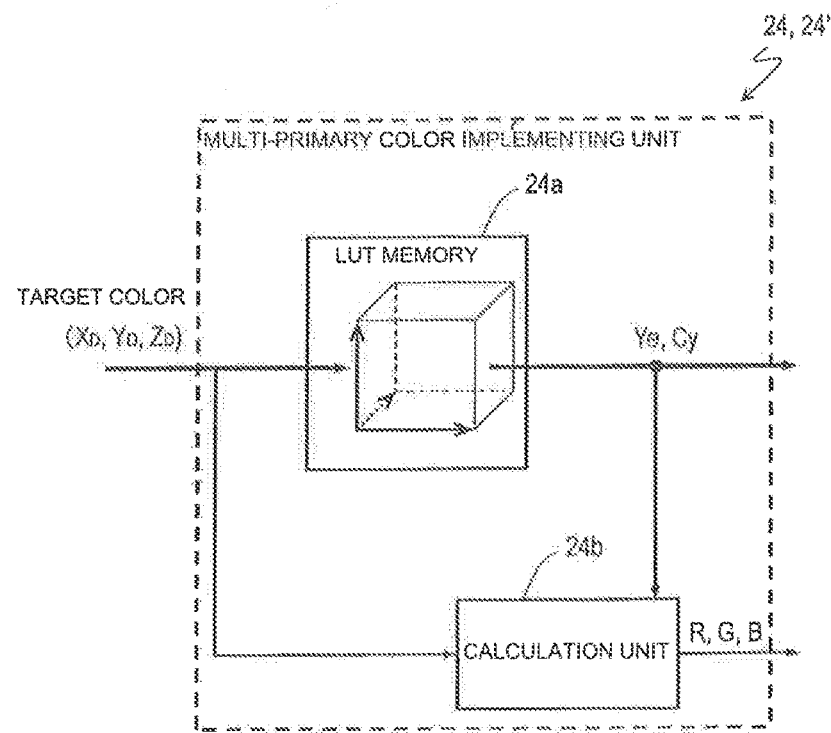
FIG. 10 is a block diagram that illustrates an example of the specific configuration of multi-primary color implementing units 24 and 24' included in the signal converting circuit 20.

FIG. 10 illustrates an example of a desired configuration of the multi-primary color implementing unit 24 (or 24'). In the example illustrated in FIG. 10, the multi-primary color implementing unit 24 (or 24') includes a lookup table memory 24a and a calculation unit 24b.

The lookup table memory 24a stores a lookup table LUT. This lookup table includes data having a three-dimensional matrix structure representing gray scale levels of the yellow sub pixel Ye and the cyan sub pixel Cy corresponding to tristimulus values $X_D$, $Y_D$, and $Z_D$ of a target color. By referring to the lookup table stored in the lookup table memory 24a, the gray scale levels of the yellow sub pixel Ye and the cyan sub pixel Cy corresponding to an achromatic color represented by the tristimulus values $X_D$, $Y_D$, and $Z_D$ of the target color, in other words, the three-primary color image signal can be determined.

By performing calculation using the gray scale levels of the yellow sub pixel Ye and the cyan sub pixel Cy that are determined by the tristimulus values $X_D$, $Y_D$, and $Z_D$ of the target value and the lookup table memory 24a, the calculation unit 24b calculates gray scale levels of the red sub pixel R, the green sub pixel G, and the blue sub pixel B. More specifically, the calculation unit 24b performs calculation based on the following Equation (4).

[Mathematical Formula 4]

$$\begin{pmatrix} R \\ G \\ B \end{pmatrix} = \begin{pmatrix} X_R & X_G & X_B \\ Y_R & Y_G & Y_B \\ Z_R & Z_G & Z_B \end{pmatrix}^{-1} \left( \overbrace{\begin{pmatrix} X_D \\ Y_D \\ Z_D \end{pmatrix}}^{(ii)} - \overbrace{\begin{pmatrix} X_{Ye} & X_{Cy} \\ Y_{Ye} & Y_{Cy} \\ Z_{Ye} & Z_{Cy} \end{pmatrix} \begin{pmatrix} Ye \\ Cy \end{pmatrix}}^{(i)} \right) \quad (4)$$

For example, the lookup table of the multi-primary color implementing unit 24' includes data represented as (Ye, Cy)=(88, 160) in correspondence with a three-color signal (represented as ((R, G, B)=(128, 128, 128)) representing an achromatic color of a gray scale level of "128". Tristimulus values XYZ (a portion (i) in Equation (4) described above) corresponding to this data, in other words, the yellow sub pixel Ye of a gray scale level of "88" and the cyan sub pixel Cy of a gray scale levels of "160" are as illustrated in Table 4 illustrated below.

TABLE 4

| X | Y | Z |
|---|---|---|
| 0.0563 | 0.0886 | 0.0767 |

Results (a portion (ii) in Equation (4) described above) acquired by subtracting the tristimulus values XYZ represented in Table 4 from the tristimulus values $X_D$, $Y_D$, and $Z_D$ of the target color are tristimulus values XYZ of the red sub pixel R, the green sub pixel G, and the blue sub pixel B and are as illustrated in Table 5 described below.

TABLE 5

| X | Y | Z |
|---|---|---|
| 0.1591 | 0.1309 | 0.2804 |

By performing inverse matrix calculation for the tristimulus values XYZ illustrated in Table 5, the gray scale levels of the red sub pixel R, the green sub pixel G, and the blue sub pixel B can be uniquely determined. In addition, by including the data of the tristimulus values XYZ (the portion (i) in Equation (4) described above) corresponding to the gray scale levels of the yellow sub pixel Ye and the cyan sub pixel Cy in the lookup table, the calculation of the portion (i) is not required. In other words, only subtraction of the portion (ii) and the inverse matrix calculation of the whole equation may be performed.

As described above, the multi-primary color implementing unit 24 (or 24') illustrated in FIG. 10, first, determines gray scale levels of two sub pixels by using the lookup table stored in the lookup table memory 24a and, thereafter, calculates gray scale levels of the remaining three sub pixels by using the calculation unit 24b. Thus, the lookup table stored in the lookup table memory 24a does not need to include data of all the five sub pixels and may include data of only two sub pixels among the five sub pixels. Accordingly, by employing the configuration as illustrated in FIG. 10, the lookup table can be configured in a simple manner by using as low-priced memory having a small capacity.

In the description presented above, while an example has been described in which data representing the gray scale levels of the yellow sub pixel Ye and the cyan sub pixel Cy is included in the lookup table, and the gray scale levels of the remaining red, green, and blue sub pixels R, G, and B are calculated by the calculation unit 24b, data included in the lookup table in advance does not necessarily need to be data of the yellow sub pixel Ye and the cyan sub pixel Cy. By including data representing the gray scale levels of arbitrary two sub pixels in the lookup table, the gray scale levels of the remaining three sub pixels can be calculated by the calculation unit 24b.

In addition, also in a case where the number of sub pixels defining one pixel is other than five, the data amount of the lookup table can be decreased by using a similar technique. When the number of primary colors used for display is n, each of the multi-primary color implementing units 24 and 24' may determine the gray scale levels of (n−3) primary colors among n primary colors by referring to the lookup table (in other words, data relating to (n−3) primary colors is included in the lookup table) and calculate the gray scale levels of the remaining three primary colors among n primary colors by performing calculation using the gray scale levels of (n−3) primary colors.

For example, in a case where one pixel is defined by four sub pixels (a red sub pixel R, a green sub pixel G, a blue sub pixel B, and a yellow sub pixel Ye), the signal converting circuit 20 may acquire the luminance level of one sub pixel by referring to the lookup table and calculate the luminance levels of the remaining three sub pixels through a calculation process performed by the calculation unit 23. By including data causing the luminance and the chromaticity corresponding to a decrease in the gray scale level of the yellow sub pixel Ye to be compensated by the red sub pixel R and the green sub pixel G in a portion of the lookup table that corresponds to an achromatic color, a similar advantage can be acquired.

In addition, the signal converting circuit 20 does not necessarily need to perform a signal conversion in which variations in the luminance levels of all the achromatic colors of half tones are averaged. The reason for this is that there is a possibility that, in an achromatic color of the high gray scale side, when the luminance of the yellow sub pixel Ye is lowered, sufficient luminance compensation cannot be performed by using other sub pixels. For example, in a case where display is performed using a gray scale of "0" to a gray scale of "255" (in other words, display of 256 gray scale levels), for an achromatic color of a gray scale of "240" represented as (R, G, B, Ye, Cy)=(240, 240, 240, 240, 240), when the luminance of the yellow sub pixel Ye is lowered, sufficient luminance compensation cannot be performed by the other sub pixels (since there is no gray scale exceeding a gray scale level of "255"). In addition, in an achromatic color of the low gray scale side, a luminance change for each gray scale is large, and accordingly, it is difficult to finely adjust the chromaticity that is output.

In a case where a gray scale of N in the display of 256 gray scale levels (display is performed using gray scale levels of "0" to "255") is denoted by "N/255 gray scale", the signal converting circuit 20 performs a signal conversion in which variations in the luminance are averaged for achromatic colors of a 64/255 gray scale to a 200/255 gray scale, whereby a deterioration in the display quality can be sufficiently suppressed.

An example of a signal conversion for an achromatic color of a 64/255 gray scale and an achromatic color of a 200/255 gray scale will be described.

In a case where a simple signal conversion as illustrated in FIG. 3 is performed for a three-primary color image signal (represented as (R, G, B)=(64, 64, 64)) representing an achromatic color of a 64/255 gray scale, a multi-primary color image signal represented as (R, G, B, Ye, Cy)=(64, 64, 64, 64, 64) is acquired. In a case where display is performed by the multi-primary color display pane 110 using this multi-primary color image signal, the chromaticity x, y, and Y values of the achromatic color displayed by the pixel are as illustrated in the following Table 6.

TABLE 6

| x | y | Y |
| --- | --- | --- |
| 0.272 | 0.277 | 0.048 |

The signal converting circuit 20 converts the three-primary color image signal representing the achromatic color of the 64/255 gray scale into a multi-primary color image signal, for example, represented as (R, G, B, Ye, Cy)=(86, 67, 59, 47, 88). In a case where display is performed by the multi-primary color display panel 10 using this multi-primary color image signal, the chromaticity x, y, and Y values of the achromatic color displayed by the pixel are as illustrated in the following Table 7.

TABLE 7

| x | y | Y |
| --- | --- | --- |
| 0.273 | 0.278 | 0.048 |

By comparing Table 6 with Table 7, it can be understood that Y values of the achromatic colors displayed by the pixel using the multi-primary color image signal represented as (R, G, B, Ye, Cy)=(64, 64, 64, 64, 64) and the multi-primary color image signal represented as (R, G, B, Ye, Cy)=(86, 67, 59, 47, 88) are the same. In addition, it can be understood that the chromaticity levels x, and y of the achromatic colors displayed by the pixel are almost the same.

In a case where a simple signal conversion as illustrated in FIG. 3 is performed for a three-primary color image signal (represented as (R, G, B)=(200, 200, 200)) representing an achromatic color of a 200/255 gray scale, a multi-primary color image signal represented as (R, G, B, Ye, Cy)=(200, 200, 200, 200, 200) is acquired. In a case where display is performed by the multi-primary color display panel 10 using this multi-primary color image signal, the chromaticity x, y, and Y values of the achromatic color displayed by the pixel are as illustrated in the following Table 8.

TABLE 8

| x | y | Y |
| --- | --- | --- |
| 0.272 | 0.277 | 0.586 |

The signal converting circuit 20 converts the three-primary color image signal representing the achromatic color of the 200/255 gray scale into a multi-primary color image signal, for example, represented as (R, G, B, Ye, Cy)=(229, 185, 190, 185, 255). In a case where display is performed by the multi-primary color display panel 10 using this multi-primary color image signal, the chromaticity x, y, and Y values of the achromatic color displayed by the pixel are as illustrated in the following Table 9.

TABLE 9

| x | y | Y |
| --- | --- | --- |
| 0.272 | 0.278 | 0.586 |

By comparing Table 8 with Table 9, it can be understood that Y values of the achromatic colors displayed by the pixel using the multi-primary color image signal represented as (R, G, B, Ye, Cy)=(200, 200, 200, 200, 200) and the multi-primary color image signal represented as (R, G, B, Ye, Cy)=(229, 185, 190, 185, 255) are the same. In addition, it can be understood that the chromaticity levels x, and y of the achromatic colors displayed by the pixel are almost the same.

From a viewpoint of sufficiently suppressing a deterioration in the display quality and the sensed resolution by suppressing some sub pixels from being conspicuous, in a case where a three-primary color image signal representing an achromatic color of a 128/255 gray scale is input, the signal converting circuit 20 preferably performs a signal conversion such that a root mean square value (the variation amount L described above) of differences between an average luminance level of a plurality of sub pixels and the luminance level of the plurality of sub pixels is 0.023 or less and more preferably performs the signal conversion such that the variation amount is 0.019 or less. In a case where the variation amount L before the adjustment is about 0.03078, when the variation amount L after the adjustment is 0.023 or less, the variation amount L can be enhanced by about 25%. In addition, when the variation amount L after the adjustment is 0.019 or less, the variation amount L can be enhanced by about 40%.

In addition, from the same viewpoint, in a case where a three-primary color image signal representing an achromatic color of a 160/255 gray scale is input, the signal converting circuit 20 preferably performs the signal conversion such that the variation amount L is 0.0377 or less and more preferably performs the signal conversion such that the variation amount L is less than 0.0302 or less. In a case where the variation amount L before the adjustment is about 0.0503, when the variation amount L after the adjustment is 0.0377 or less, the variation amount L can be enhanced by about 25%. In addition, when the variation amount L after the adjustment is 0.0302 or less, the variation amount L can be enhanced by about 40%.

Furthermore, from the same viewpoint, in a case where a three-primary color image signal representing an achromatic color of a 96/255 gray scale is input, the signal converting circuit 20 preferably performs the signal conversion such that the variation amount L is 0.0122 or less and more preferably performs the signal conversion such that the variation amount L is less than 0.0098 or less. In a case where the variation amount L before the adjustment is about 0.0163, when the variation amount L after the adjustment is 0.0122 or less, the variation amount L can be enhanced by about 25%. In addition, when the variation amount L after the adjustment is 0.0098 or less, the variation amount L can be enhanced by about 40%.

Embodiment 2

Figure 11:
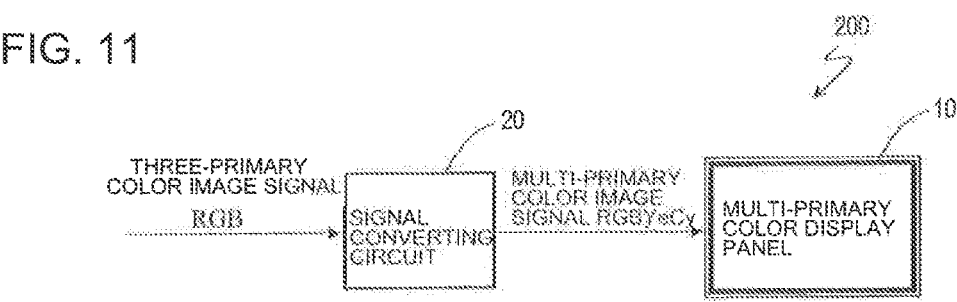
FIG. 11 is a block diagram that schematically illustrates a liquid crystal display device 200 according to an embodiment of the present invention.

FIG. 11 illustrates a liquid crystal display device 200 according to this embodiment. The liquid crystal display device 200, as illustrated in FIG. 11, includes a multi-primary color display panel 10 and a signal converting circuit 20 and is a multi-primary color display device that performs display by using four or more primary colors.

Figure 12:
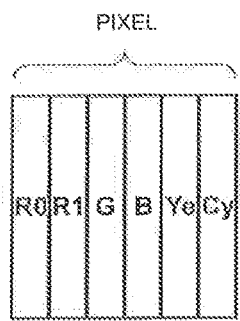
FIG. 12 is a diagram that illustrates the pixel configuration of the liquid crystal display device 200.

The multi-primary color display panel 10 includes a plurality of pixels arranged in a matrix pattern, and each pixel is defined by a plurality of sub pixels. FIG. 12 illustrates the pixel configuration of the multi-primary color display panel 10. As illustrated in FIG. 12, each pixel is defined by a red sub pixel R0 displaying red, an additional red sub pixel R1 additionally displaying red, a green sub pixel G displaying green, a blue sub pixel B displaying blue, a yellow sub pixel Ye displaying yellow, and a cyan sub pixel Cy displaying cyan.

Table 10 presented below illustrates an example of chromaticity x, y and Y values of primary colors (in other words, red, green, blue, yellow, and cyan) displayed by the red sub pixel R0, the additional red sub pixel R1, the green sub pixel G, the blue sub pixel B, the yellow sub pixel Ye, and the cyan sub pixel Cy. Regarding red, a value acquired by combining red displayed by the red sub pixel R0 and red displayed by the additional red sub pixel R1 is represented.

TABLE 10

|  | x | y | Y |
|---|---|---|---|
| Red | 0.6784 | 0.3091 | 0.1347 |
| Green | 0.2451 | 0.6442 | 0.2563 |
| Blue | 0.1456 | 0.0520 | 0.0570 |
| Yellow | 0.4398 | 0.5468 | 0.4404 |
| Cyan | 0.1410 | 0.3726 | 0.1120 |

In FIG. 12, while an example is illustrated in which the red sub pixel R0, the additional red sub pixel R1, the green sub pixel G, the blue sub pixel B, the yellow sub pixel Ye, and the cyan sub pixel Cy are arranged in this order from the left side toward the right side within the pixel, the arrangement of the sub pixels is not limited thereto.

The signal converting circuit 20 converts an input three-primary color image signal into a multi-primary color image signal corresponding to four or more (here, five) primary colors. The multi-primary color image signal output from the signal converting circuit 20 is input to the multi-primary color display panel 10, and a color corresponding to the input multi-primary color image signal is displayed by each pixel. Also in this embodiment, the multi-primary color display panel 10 is a liquid crystal display panel.

In a case where a three-primary color image signal representing at least a certain achromatic color of a half tone is input, the signal converting circuit 20 of the liquid crystal display device 200 performs a signal conversion such that variations in the luminance levels of a plurality of sub pixels are equalized. In other words, the signal conversion is performed such that variations between the luminance levels of the sub pixels are smaller than those of a case (a comparative example to be described later) where a three-primary color image signal representing an achromatic color is simply converted into a multi-primary color image signal. Accordingly, a decrease in the display quality at the time of displaying an achromatic color using the pixel can be suppressed.

Figure 13:
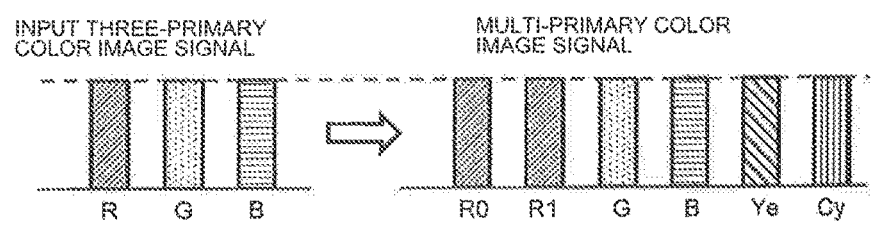
FIG. 13 is a diagram that illustrates a multi-primary color conversion of a comparative example.

FIG. 13 schematically illustrates a signal conversion of the comparative example. This comparative example represents a general signal conversion of a case where an achromatic color is displayed. In this comparative example, the gray scale levels of red, green, and blue defined by an input three-primary color image signal directly become the gray scale levels of the red sub pixel R0, the additional red sub pixel R1, the green sub pixel G, the blue sub pixel B, the yellow sub pixel Ye, and the cyan sub pixel Cy defined by a multi-primary color image signal. For example, a three-primary color image signal representing an achromatic color of a gray scale level of "128", in other words, a three-primary color image signal represented as (R, G, B)=(128, 128, 128) is converted into a multi-primary color image signal defining a gray scale level of 128 for all the red sub pixel R0, the additional red sub pixel R1, the green sub pixel G, the blue sub pixel B, the yellow sub pixel Ye, and the cyan sub pixel Cy, in other words, a multi-primary color image signal represented as (R0, R1, G, B, Ye, Cy)=(128, 128, 128, 128, 128, 128).

Figure 14:
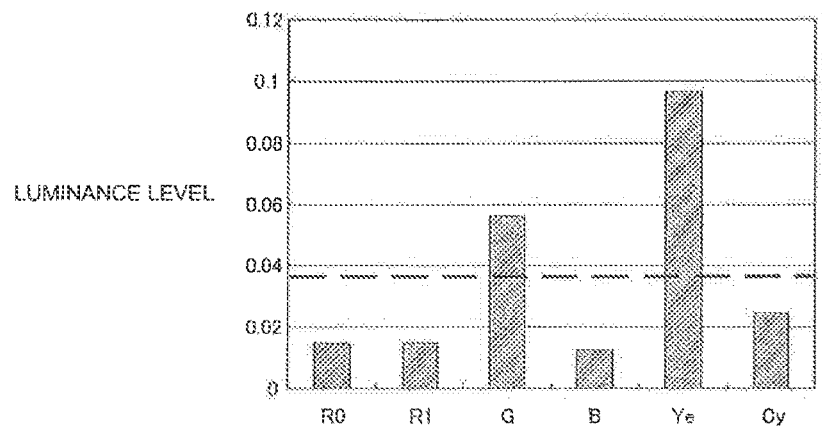
FIG. 14 is a graph that illustrates luminance levels of a red sub pixel R0, an additional red sub pixel R1, a green sub pixel G, a blue sub pixel B, a yellow sub pixel Ye, and a cyan sub pixel Cy in a case where the multi-primary color conversion of the comparative example is performed.

In a case where this multi-primary color image signal is displayed by the multi-primary color display panel 10 including a red sub pixel R0, an additional red sub pixel R1, a green sub pixel G, a blue sub pixel B, a yellow sub pixel Ye, and a cyan sub pixel Cy according to specifications illustrated in Table 10, the luminance levels of the sub pixels are as illustrated in FIG. 14. In FIG. 14, a dotted line illustrates an average luminance level. As illustrated in FIG. 14, among the plurality of sub pixels defining one pixel, the luminance level of the yellow sub pixel Ye is extremely high. For this reason, the yellow sub pixel Ye is conspicuous and becomes display of a stripe pattern in a case where color filers are arranged in a stripe pattern. Accordingly, the display quality and the sensed resolution deteriorate.

In contrast, in a case where a three-primary color image signal representing at least an achromatic color of a half tone is input, the signal converting circuit 20 of the liquid crystal display device 200 performs a signal conversion such that variations in the luminance levels of the plurality of sub pixels are equalized. In other words, a combination of luminance levels in which the variations in the luminance levels of the sub pixels are smaller than those of the above-described comparative example is selected. For this reason, it is difficult for the yellow sub pixel Ye to be conspicuous, and deteriorations in the display quality and the sensed resolution are suppressed.

Figure 15:
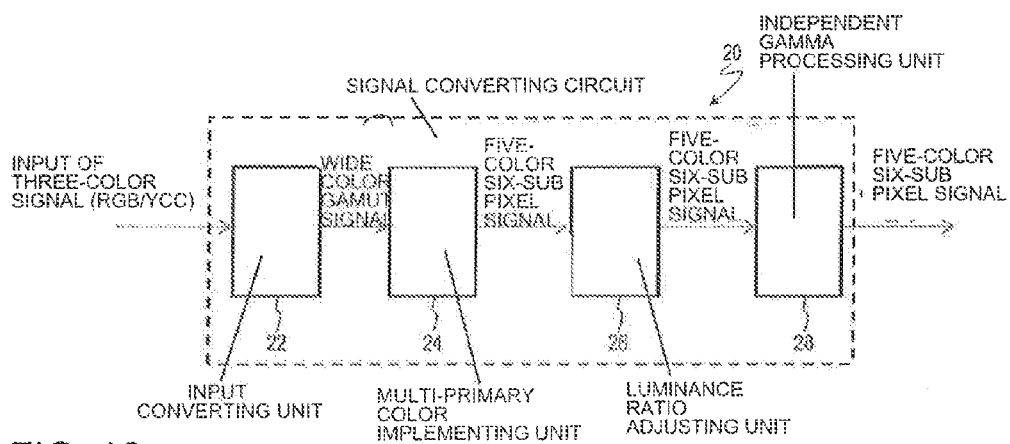
FIG. 15 is a block diagram that illustrates an example of the specific configuration of a signal converting circuit 20 included in the liquid crystal display device 200.

FIG. 15 illustrates an example of the specific configuration of the signal converting circuit 20 of the liquid crystal display device 200. The signal converting circuit 20 includes a multi-primary color implementing unit 24 that generates a multi-primary color image signal based on an input three-primary color image signal. In the example illustrated in FIG. 15, the signal converting circuit 20 further includes an input converting unit 22, a luminance ratio adjusting unit 26, and an independent gamma processing unit 28.

The input converting unit 22 converts the input three-color signal (three-primary color image signal) into a wide color gamut signal used inside the circuit. The three-color signal, for example, is an RGB signal or a YCC signal. More specifically, the wide color gamut signal is an RGB signal including a negative value (negative gray scale level), a tristimulus value XYZ, or the like.

The multi-primary color implementing unit 24 converts the wide color gamut signal into a five-color six-sub pixel signal (multi-primary color image signal). This conversion, for example, is performed using a lookup table.

In a case where a three-primary color image signal representing at least an achromatic color of a half tone is input (here, input as a wide color gamut signal) to the multi-primary color implementing unit 24, the luminance ratio adjusting unit 26 adjusts the five-color six-sub pixel signal (multi-primary color image signal) generated by the multi-primary color implementing unit 24 such that variations in the luminance levels of the plurality of sub pixels are equalized. In other words, the luminance ratio of the plurality of sub pixels is adjusted by the luminance ratio adjusting unit 26.

The luminance ratio adjusting unit 26 typically adjusts a five-color six-sub pixel signal (multi-primary color image signal) such that the luminance level of the yellow sub pixel Ye defined by the five-color six-sub pixel signal becomes lower after the adjustment than before the adjustment, and the luminance levels of the red sub pixel R0, the additional red sub pixel R1, and the green sub pixel G defined by the five-color six-sub pixel signal are higher after the adjustment than before the adjustment.

The independent gamma processing unit 28 independently performs a gamma process for each sub pixel. The five-color six-sub pixel signal output from the independent gamma processing unit 28 is input to the multi-primary color display panel 10.

Here, a specific example of the adjustment of the luminance ratio that is performed by the luminance ratio adjusting unit 26 will be described.

Here, a case will be described as an example in which a three-color signal (represented as (R, G, B)=(128, 128, 128)) representing an achromatic color of a gray scale of "128" is input. In a case where the multi-primary color implementing unit 24 performs a simple conversion similar to that of the comparative example, a five-color six-sub pixel signal represented as (R0, R1, G, B, Ye, Cy)=(128, 128, 128, 128, 128, 128) is generated by the multi-primary color implementing unit 24. In a case where display is performed by the multi-primary color display panel 10 by using this five-color six-sub pixel signal without performing adjustment using the luminance ratio adjusting unit 26, the chromaticity x, y, and Y values of an achromatic color displayed by the pixel are as those illustrated in the following Table 11. In addition, the luminance ratio of the red sub pixel R0, the additional red sub pixel R1, the green sub pixel G, the blue sub pixel B, the yellow sub pixel Ye, and the cyan sub pixel Cy is as illustrated in FIG. 14.

TABLE 11

| x | y | Y |
|---|---|---|
| 0.313 | 0.329 | 0.220 |

Here, as an index that evaluates variations in the luminance levels of a plurality of sub pixels defining one pixel, a root mean square value L ("variation amount") of differences between an average luminance level of the plurality of sub pixels and the luminance levels of the plurality of sub pixels will be used. When the luminance level of the red sub pixel R0 is denoted by $Y_{R0}$, the luminance level of the additional red sub pixel R1 is denoted by $Y_{R1}$, the luminance level of the green sub pixel G is denoted by $Y_G$, the luminance level of the blue sub pixel B is denoted by $Y_B$, the luminance level of the yellow sub pixel Ye is denoted by $Y_{Ye}$, and the luminance level of the cyan sub pixel Cy is denoted by $Y_{Cy}$, and an average luminance level thereof is denoted by $Y_{ave}$, the variation amount L is represented in the following Equation (5). In case of the luminance ratio illustrated in FIG. 14, the variation amount L is 0.030735.

[Mathematical Formula 5]

$$L = \sqrt{\frac{(Y_{R0}-Y_{ave})^2 + (Y_{R1}-Y_{ave})^2 + (Y_G-Y_{ave})^2 + (Y_B-Y_{ave})^2 + (Y_{Ye}-Y_{ave})^2 + (Y_{Cy}-Y_{ave})^2}{6}} \quad (5)$$

Figure 16:
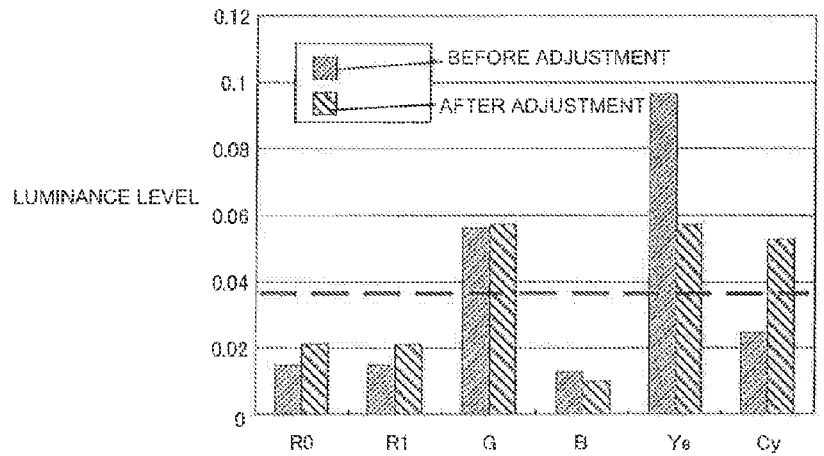
FIG. 16 is a graph that illustrates the luminance levels of each sub pixel before and after adjustment performed by a luminance ratio adjusting unit 26 included in the signal converting circuit 20.

The luminance ratio adjusting unit 26, for example, adjusts the five-color six-sub pixel signal represented as (R0, R1, G, B, Ye, Cy)=(128, 128, 128, 128, 128, 128) into a five-color six-sub pixel signal represented as (R0, R1, G, B, Ye, Cy)=(151, 151, 130, 116, 100, 181). In a case where display is performed by the multi-primary color display panel 10 by using the five-color six-sub pixel signal after the adjustment, the chromaticity x, y, and Y values of an achromatic color displayed by the pixel are as illustrated in the following Table 12. In addition, the luminance ratios of the red sub pixel R0, the additional red sub pixel R1, the green sub pixel G, the blue sub pixel B, the yellow sub pixel Ye, and the cyan sub pixel Cy before the adjustment and after the adjustment are as illustrated in FIG. 16.

TABLE 12

| x | y | Y |
|---|---|---|
| 0.313 | 0.330 | 0.219 |

By comparing Table 11 with Table 12, it can be understood that the chromaticity levels x and y of an achromatic color, which is displayed by the pixel, before and after the adjustment are the same. In addition, it can be understood that a Y value of an achromatic color, which is displayed by the pixel, is almost the same before and after the adjustment.

In addition, based on FIG. 16, it can be understood that the luminance level of the yellow sub pixel Ye becomes lower after the adjustment than before the adjustment, and the luminance levels of the red sub pixel R0, the additional red sub pixel R1, and the green sub pixel G become higher after the adjustment than before the adjustment. In addition, it can be understood that the luminance level of the blue sub pixel B becomes slightly lower after the adjustment than before the adjustment, and the luminance level of the cyan sub pixel Cy becomes slightly higher after the adjustment than before the adjustment In case of the luminance ratio after the adjustment that is illustrated in FIG. 16, the variation amount L is 0.01950. Thus, the variation amount L decreases by about 40% after the adjustment. Accordingly, it is difficult for the yellow sub pixel Ye to be conspicuous, and display of a stripe pattern is prevented, whereby a decrease in the display quality is suppressed.

Figure 17:
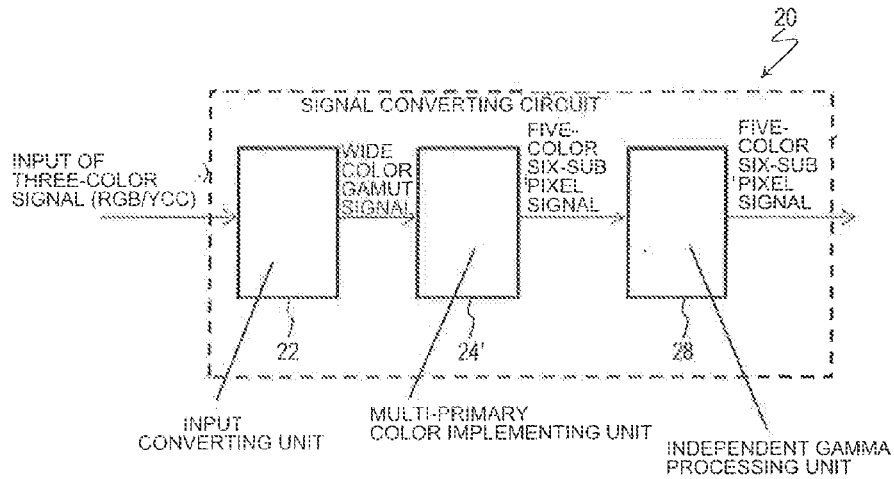
FIG. 17 is a block diagram that illustrates another example of the specific configuration of the signal converting circuit 20 included in the liquid crystal display device 200.
Figure 18:
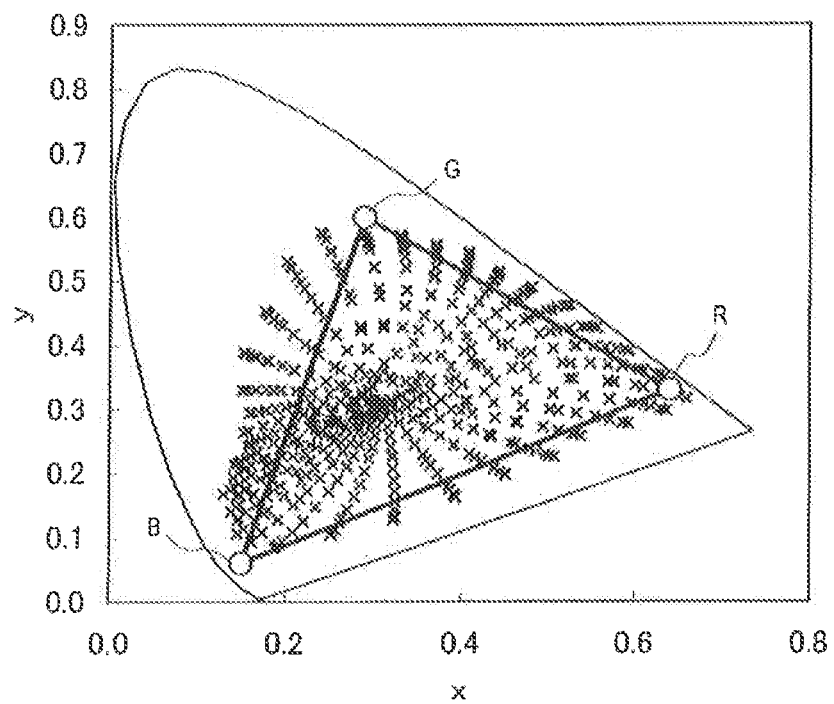
FIG. 18 is an xy chromaticity diagram that illustrates a color reproduction range of a three-primary color display device.
Figure 19:
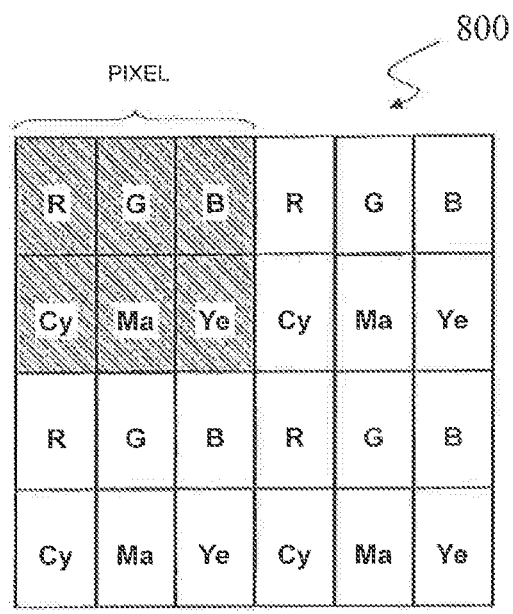
FIG. 19 is a diagram that schematically illustrates a conventional multi-primary color liquid crystal display device 800.
Figure 20:
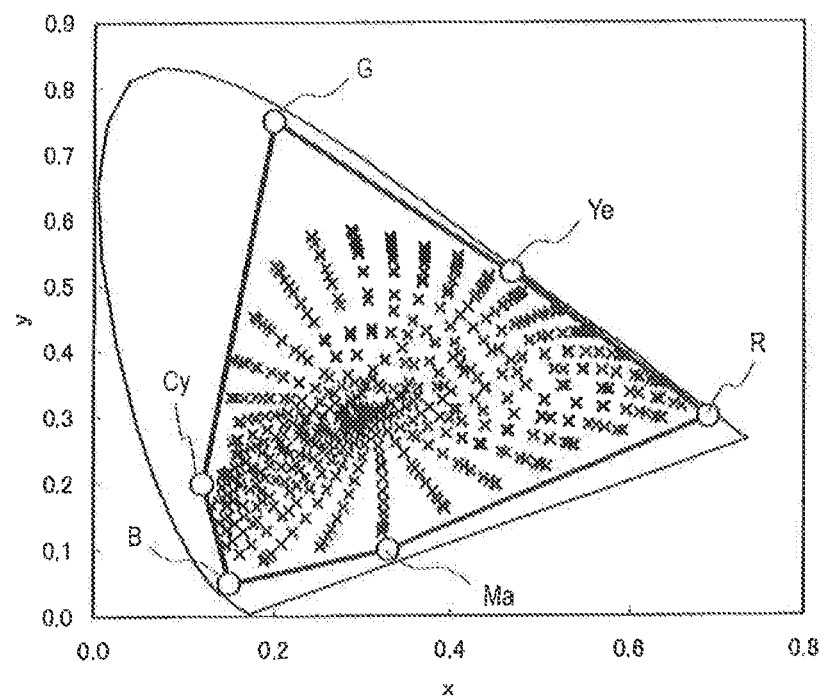
FIG. 20 is an xy chromaticity diagram that illustrates a color reproduction range of the multi-primary color liquid crystal display device 800.

Here, the specific configuration of the signal converting circuit 20 is not limited to the example illustrated in FIG. 15. In addition, the signal converting circuit 20 does not necessarily need to include the luminance ratio adjusting unit 26. FIG. 17 illustrates another example of the specific configuration of the signal converting circuit 20.

In the example illustrated in FIG. 17, the signal converting circuit 20 does not include the luminance ratio adjusting unit 26. In addition, in the example illustrated in FIG. 17, the signal converting circuit 20 includes a multi-primary color implementing unit 24' that has a function different from the multi-primary color implementing unit 24 represented in the example illustrated in FIG. 15. In a case where a three-color signal (three-primary color image signal) representing at least an achromatic color of a half tone is input, this multi-primary color implementing unit 24' generates a five-color six-sub pixel signal (multi-primary color image signal) in which variations in the luminance levels of a plurality of sub pixels are averaged. In other words, in the example illustrated in FIG. 17, the multi-primary color implementing unit 24' performs a multi-primary color conversion in consideration of the luminance ratio.

As described above, according to the liquid crystal display devices 100 and 200 of Embodiments 1 and 2, a deterioration in the display quality at the time of displaying an achromatic color using a pixel is suppressed.

Here, the plurality of sub pixels configuring one pixel are not limited to those illustrated in Embodiments 1 and 2 as examples. For example, the plurality of sub pixels configuring one pixel may include a magenta sub pixel Ma displaying magenta instead of the cyan sub pixel Cy. In addition, the number of primary colors used for the display is not limited to five that is illustrated in Embodiments 1 and 2 as examples. Thus, the number of primary colors used for the display may be four or six or more.

In the description presented above, while the case has been described as an example in which a three-primary color image signal represented as (R, G, B)=(N, N, N) is input, the three-primary color image signal representing an achromatic color is not limited to the signal represented as (R, G, B)=(N, N, N).

Since there is a margin in the color temperature adjustment in the display panel, in a display panel designed for a high color temperature, a white color of which the color temperature is lowered may be displayed according to an input signal, for example, represented as (R, G, B)=(255, 255, 200). As above, since a white color at an arbitrary color temperature can be generated through a gray scale control process, the three-primary color image signal representing an achromatic color is not limited to the signal represented as (R, G, B)=(N, N, N).

In this specification, when a minimal gray scale level of an input gray scale level (R, G, B) is denoted as A_MIN=MIN(R, G, B), and a maximal gray scale level thereof is denoted as A_MAX=MAX(R, G, B), in a case where A_MIN/A_MAX is 0.78 or more, the three-primary color image signal is assumed to represent an achromatic color. For a three-primary color image signal represented as (R, G, B)=(255, 255, 255), A_MIN/A_MAX is 1.0 (=255/255). In addition, for a three-primary color image signal represented as (R, G, B)=(255, 255, 200), A_MIN/A_MAX is 0.78 (=200/255).

In a display panel designed for a high color temperature, in a case where an achromatic color of which the color temperature is lowered is desired to be displayed, in order to reduce a blue component, the gray scale level of blue is lowed to form the achromatic color. For example, in a case where "(R, G, B)=(N', N", M)" is set so as to lower the color temperature of an achromatic color represented as (R, G, B)=(N, N, N), a relation of "N', N">M" is satisfied. The reason for this is that, while the gray scale levels of red and green are arbitrarily increased or decreased so as to perform chromaticity adjustment according to a target chromaticity point, the gray scale level of blue needs to be lowered by a large amount so as to decrease the blue component.

In a case where an achromatic color that is not represented as (R, G, B)=(N, N, N) is defined in this way, by performing linear interpolation for values acquired through the adjustment process described above, an achromatic color corresponding to each gray scale can be determined. For example, the achromatic color that is set as (R, G, B)=(255, 255, 200) by lowering the color temperature through the adjustment process described above is set as an achromatic color of a gray scale level of "255" at the color temperature (in other words, a maximal gray scale level among the gray scale levels of red, green, and blue is set as the gray scale level of the achromatic color), and linear interpolation for a zero gray scale (R, G, B)=(0, 0, 0) is performed for the remaining, whereby an achromatic color of each gray scale level can be determined. For example, in this case, an achromatic color of a gray scale level of "200" is (200, 200, 157), and an achromatic color of a gray scale level of "128" is (128, 128, 100).

INDUSTRIAL APPLICABILITY

According to an embodiment of the present invention, a multi-primary color display device capable of suppressing a deterioration in the display quality at the time of displaying an achromatic color using a pixel is provided. The multi-primary color display device according to the embodiment of the present invention can perform high-quality display and accordingly, is appropriately used for various electronic devices starting from a liquid crystal television set.

REFERENCE SIGNS LIST

10 Multi-primary color display panel
20 Signal converting circuit
22 Input converting unit
24 and 24' Multi-primary color implementing unit
24a Lookup table memory
24b Calculation unit
26 Luminance ratio adjusting unit
26a Hue detecting unit
26b Luminance converting unit
26c Average luminance/luminance difference calculating unit
26d Luminance difference adjusting unit
26e Gray scale converting unit
28 Independent gamma processing unit 100 and 200 Liquid crystal display device (multi-primary color display device)
R and R0 Red sub pixel
R1 Additional red sub pixel
G Green sub pixel
B Blue sub pixel
Ye Yellow sub pixel
Cy Cyan sub pixel
Ma Magenta sub pixel

The invention claimed is:

1. A multi-primary color display device comprising:
a multi-primary color display panel including a pixel that is defined by a plurality of sub pixels including a red sub pixel, a green sub pixel, a blue sub pixel, and a yellow sub pixel; and
a signal converting circuit converting a three-primary color image signal corresponding to three primary colors into a multi-primary color image signal corresponding to four or more primary colors,
in a case where a three-primary color image signal representing at least an achromatic color of a half tone is input, the signal converting circuit performs a signal conversion such that variations in luminance levels of the plurality of sub pixels are equalized;
in a case where a three-primary color image signal representing an achromatic color of a 128/255 gray scale is input, the signal converting circuit performs a signal conversion such that a root mean square value of differences between an average luminance level of the plurality of sub pixels and luminance levels of the plurality of sub pixels is 0.023 or less; and
the signal converting circuit includes independent gamma processing circuitry that independently performs a gamma processing for each of the plurality of sub pixels.

2. The multi-primary color display device according to claim 1,
wherein the signal converting circuit includes multi-primary color implementing circuitry that generates a multi-primary color image signal based on an input three-primary color image signal, and
the signal converting circuit further includes luminance ratio adjusting circuitry that adjusts a multi-primary color image signal generated by the multi-primary color implementing circuitry such that variations in luminance levels of the plurality of sub pixels are equalized in a case where a three-primary color image signal representing at least an achromatic color of a half tone is input to the multi-primary color implementing circuitry.

3. The multi-primary color display device according to claim 2, wherein the luminance ratio adjusting circuitry performs adjustment of the multi-primary color image signal such that a luminance level of the yellow sub pixel that is defined by the multi-primary color image signal is lowered after the adjustment than before the adjustment, and luminance levels of the red sub pixel and the green sub pixel defined by the multi-primary color image signal are raised after the adjustment than before the adjustment.

4. The multi-primary color display device according to claim 2, wherein the luminance ratio adjusting circuitry performs the adjustment of the multi-primary color image signal such that ΔE, which is a color difference between before and after the adjustment, of an achromatic color displayed by the pixel is 3.0 or less.

5. The multi-primary color display device according to claim 2, wherein, when the number of primary colors used for display is n, the multi-primary color implementing circuitry determines gray scale levels of (n−3) primary colors among the n primary colors by referring to a lookup table based on the input three-primary color image signal and calculates gray scale levels of the remaining three primary colors among the n primary colors by performing calculation using the gray scale levels of the (n−3) primary colors.

6. The multi-primary color display device according to claim 1,
wherein the signal converting circuit includes multi-primary color implementing circuitry that generates a multi-primary color image signal based on an input three-primary color image signal, and
in a case where the three-primary color image signal representing at least an achromatic color of a half tone is input, the multi-primary color implementing circuitry generates a multi-primary color image signal in which variations in luminance levels of the plurality of sub pixels are equalized.

7. The multi-primary color display device according to claim 6, wherein, when the number of primary colors used for display is n, the multi-primary color implementing circuitry determines gray scale levels of (n−3) primary colors among the n primary colors by referring to a lookup table based on the input three-primary color image signal and calculates gray scale levels of the remaining three primary colors among the n primary colors by performing calculation using the gray scale levels of the (n−3) primary colors.

8. The multi-primary color display device according to claim 7, wherein the multi-primary color implementing circuitry includes a lookup table memory storing the lookup table and calculation circuitry that performs the calculation.

9. The multi-primary color display device according to claim 1, wherein the three-primary color image signal representing at least the achromatic color of the half tone is a three-primary color image signal that represents an achromatic color of a 64/255 gray scale to a 200/255 gray scale.

10. The multi-primary color display device according to claim 1, wherein the plurality of sub pixels include a cyan sub pixel.

11. The multi-primary color display device according to claim 1, wherein the plurality of sub pixels include an additional red sub pixel.

12. The multi-primary color display device according to claim 1, wherein the multi-primary color display panel includes one pair of substrates facing each other and a liquid crystal layer disposed between the one pair of substrates.

* * * * *